UNITED STATES PATENT OFFICE.

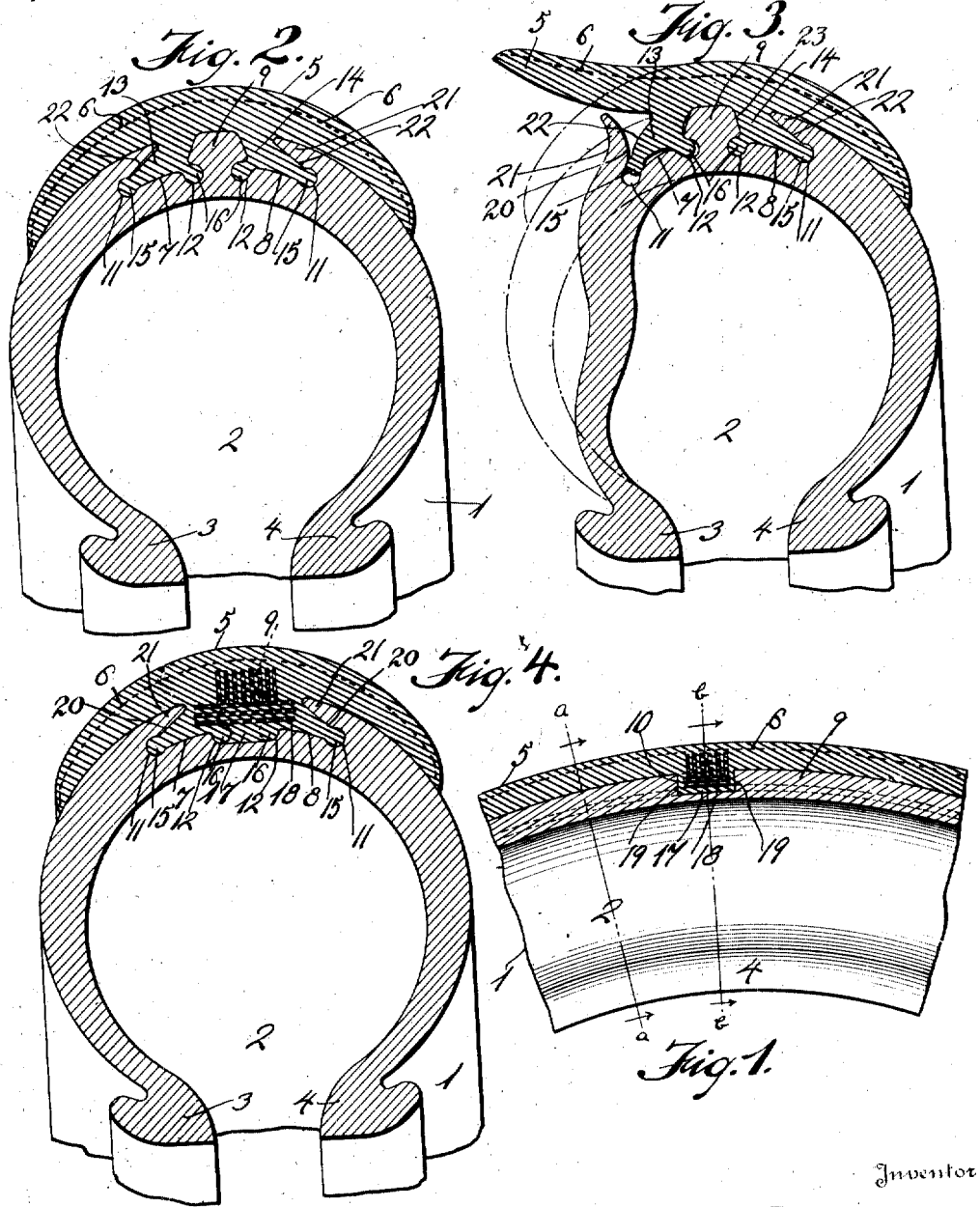

JOHN V. DEWALD, OF PHILADELPHIA, PENNSYLVANIA.

RESILIENT TIRE.

1,228,539.     Specification of Letters Patent.     Patented June 5, 1917.

Application filed September 12, 1916. Serial No. 119,635.

*To all whom it may concern:*

Be it known that I, JOHN V. DEWALD, a citizen of the United States, residing at Philadelphia, in the county of Philadelphia and State of Pennsylvania, have invented certain new and useful Improvements in Resilient Tires, of which the following is a specification.

My invention consists of an improved resilient tire for vehicle wheels, one object of my invention being to make a durable resilient tire which may be inflated with air and which will include a removable tread.

Another object of my invention is to so design my improved tire that the tread may be easily removed or replaced when the tire is deflated and will be firmly held in place when the tire is inflated.

Another object of my invention is to so construct my improved tire that the removable tread will be locked against circumferential movement when the tire is inflated and ready for use.

These objects, and other advantageous ends which will be described hereinafter, I attain in the following manner, reference being had to the accompanying drawings in which—

Figure 1 is a fragmentary section of my improved tire, the section being taken in the direction of a central vertical plane transversely to the axis of the tire.

Fig. 2 is an enlarged section on the line *a—a* of Fig. 1 showing the position of the tire when inflated and ready for use.

Fig. 3 is a section similar to that shown in Fig. 2, showing in full line position the manner of attaching or detaching the tread when the tire is deflated and in dot-and-dash lines the position assumed by the tread and other portion of the tire when the latter is inflated.

Fig. 4 is an enlarged section on the line *b—b* of Fig. 1.

Referring to the drawings, 1 represents the body portion of my improved tire which is hollow as shown at 2 and designed to receive an inner tube (not shown).

3 and 4 represent the beads of the tire and may be of any desirable construction and are designed to be attached to the rim of a wheel. The detachable tread portion 5 may be made of tough rubber which is reinforced as shown at 6 or may be made of any other tough flexible material.

The body portion 1 has two annularly extending recesses 7 and 8 which are so located as to provide a central flange 9 which extends circumferentially of the tire, but is interrupted at pre-determined points throughout the circumference of the tire to form transversely extending cavities 10 (see Fig. 1).

The recesses 7 and 8 each include circumferentially extending grooves 11 at positions remote from the central flange 9 and circumferentially extending grooves 12 which form under-cut surfaces for the central flange 9, said grooves 11 and 12 being formed by undercutting the recesses 7 and 8 at their extreme inner portions. The grooves 12 are interrupted by the cavities 10 and extend from one cavity to another cavity.

The tread portion 5 has two inwardly extending flanges 13 and 14 which are designed to fit within the recesses 7 and 8 of the body portion 1. Each of the flanges 13 and 14 has a circumferentially extending bead 15 designed to fit said annular grooves 11 and also includes beads 16 which fit the grooves 12 in said body portion. These beads 16, at pre-determined positions registering with the cavities 10, are connected by the material forming said tread as shown at 17 in Fig. 4, said connecting portion having reinforcing members 18 embedded therein and serving to completely fill the cavities 10, thus forming an interlock between the tread and the body portion 1 which prevents the tread from creeping circumferentially to the body portion, the reinforced portion 18 acting to abut the shoulders 19 which are formed by the ends of the central flange 9 (see Figs. 1 and 4).

The outer side walls 20 of the portion 1 which forms the cavities 7 and 8 extend at an angle so as to provide lip portions 21, and the outer surfaces 22 of the flanges 13 and 14 of the tread also extend at an angle to form recesses into which the lip portions 21 fit.

The flanges 13 and 14 of the tread 2 being spaced as illustrated, provide a groove 23 into which the central flange 9 of the body portion fits, said groove 23 being interrupted by the portion 17 which fits within the cavities 10.

I preferably form the body portion 1 of my tire of flexible rubber, so that it may be bent, when the tire is not inflated, to facilitate the insertion of the flanges 13 and 14 within the recesses 7 and 8 in the body portion 1.

When the body portion 1 is inflated, the pressure causes the body portion to be moved outwardly so as to firmly press the engaging portions of the tread and tire together, so that it is impossible for the tread to work loose from the body portion when the tire is in service.

Furthermore, a tire made in accordance with my invention may be replaced with a new tread when the old tread becomes worn, and thus greatly lengthens the life of the tire which renders it especially desirable for the owners of vehicles employing tires of this type.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A tire for vehicle wheels, comprising a body and a tread section both made of flexible material, said sections having interlocking flange and groove connection one with the other, the flange portion being interrupted in its length to form cavities, means interposed in said cavities and projecting from said other section to form an interlock between the sections to prevent relative creeping movement between the tread section and body section, and reinforcing material embedded within said means, substantially as described.

2. A tire for vehicle wheels, comprising a body section and a tread section, said body section having under-cut annular recesses and a flange extending between said recesses, said flange being interrupted at pre-determined positions throughout its length to form cavities, said tread section having flanges fitting said recesses, and portions designed to extend within said cavities to form an interlock between said sections, said latter portions being reinforced, substantially as described.

3. A tire for vehicle wheels, comprising a body section and a tread section, said body section having under-cut annular recesses and annular grooves adjacent the outer portions of said recesses, a flange extending between said recesses, said flange being interrupted at pre-determined positions throughout its length to form cavities, said tread section having flanges fitting said recesses and including beaded portions fitting said annular grooves, said flanged portions of the tread section being connected at pre-determined positions throughout the length thereof, said connecting portion fitting within said cavities to form an interlock between said sections, said connecting portion including reinforcing material to prevent shear of the material positioned within said cavities, substantially as described.

In testimony whereof I have signed my name to this specification in the presence of two subscribing witnesses.

JOHN V. DEWALD.

Witnesses:
RHODA E. GILLIES,
CHAS. E. POTTS.